US008234399B2

(12) United States Patent
Wood (10) Patent No.: US 8,234,399 B2
(45) Date of Patent: Jul. 31, 2012

(54) METHOD AND APPARATUS FOR AUTOMATIC PHY CALIBRATION BASED ON NEGOTIATED LINK SPEED

(75) Inventor: Robert B. Wood, Niwot, CO (US)

(73) Assignee: Seagate Technology LLC, Cupertino, CA (US)

( * ) Notice: Subject to any disclaimer, the term of this patent is extended or adjusted under 35 U.S.C. 154(b) by 1854 days.

(21) Appl. No.: 10/448,254

(22) Filed: May 29, 2003

(65) Prior Publication Data

US 2004/0243666 A1    Dec. 2, 2004

(51) Int. Cl.
*G06F 15/16* (2006.01)

(52) U.S. Cl. ........ 709/233; 709/228; 709/231; 709/232; 702/85; 702/96; 702/142; 370/230; 370/231; 370/232; 370/235; 370/252; 370/395.41; 370/275; 370/421

(58) Field of Classification Search .............. 709/228, 709/231, 232, 233, 220, 237, 248
See application file for complete search history.

(56) References Cited

U.S. PATENT DOCUMENTS

| 4,630,126 | A | * | 12/1986 | Kaku et al. ............... 358/406 |
| 4,910,794 | A | * | 3/1990 | Mahany .................. 455/67.14 |
| 5,023,869 | A | * | 6/1991 | Grover et al. ............. 370/421 |
| 5,682,386 | A | | 10/1997 | Arimilli |
| 5,777,984 | A | * | 7/1998 | Gun et al. ................ 370/230 |
| 5,805,925 | A | * | 9/1998 | Blackwell et al. ........... 710/11 |
| 5,881,240 | A | * | 3/1999 | Asano .................... 709/233 |
| 5,925,097 | A | | 7/1999 | Gopoinath |
| 5,950,124 | A | * | 9/1999 | Trompower et al. ....... 455/422.1 |
| 6,038,602 | A | * | 3/2000 | Ishikawa ................. 709/227 |
| 6,065,060 | A | * | 5/2000 | Liu et al. ................. 709/233 |
| 6,076,115 | A | * | 6/2000 | Sambamurthy et al. ...... 709/250 |
| 6,085,248 | A | * | 7/2000 | Sambamurthy et al. ...... 709/229 |
| 6,101,567 | A | * | 8/2000 | Kim et al. ................ 710/305 |
| 6,105,119 | A | | 8/2000 | Kerr |
| 6,185,622 | B1 | * | 2/2001 | Sato ..................... 709/233 |
| 6,298,370 | B1 | | 10/2001 | Tang |
| 6,393,487 | B2 | | 5/2002 | Boucher |
| 6,397,277 | B1 | * | 5/2002 | Kato et al. ............... 710/104 |
| 6,434,716 | B1 | | 8/2002 | Johnson |
| 6,581,100 | B1 | * | 6/2003 | Durin et al. .............. 709/230 |
| 6,839,345 | B2 | * | 1/2005 | Lu et al. ................. 370/365 |
| 7,016,303 | B1 | * | 3/2006 | Sakamoto et al. .......... 370/235 |
| 7,065,301 | B2 | * | 6/2006 | Shastri et al. ............. 398/183 |
| 7,116,981 | B2 | * | 10/2006 | Jeon et al. ............... 455/450 |
| 7,161,907 | B2 | * | 1/2007 | Mott .................... 370/232 |
| 7,298,748 | B2 | * | 11/2007 | Yamato ................ 370/395.41 |
| 7,369,501 | B2 | * | 5/2008 | Kim et al. ............... 370/235 |
| 7,376,147 | B2 | * | 5/2008 | Seto et al. ............... 370/465 |
| 7,453,833 | B2 | * | 11/2008 | Yi et al. ................. 370/278 |
| 7,499,486 | B2 | * | 3/2009 | Boer et al. .............. 375/219 |

(Continued)

*Primary Examiner* — Michael Won
(74) *Attorney, Agent, or Firm* — David K. Lucente (57) ABSTRACT

A serial ATA interface calibrates serially connected components of a computer system linked by the interface to a negotiated data transmission speed. The interface negotiates the fastest data transmission speed supported by the serially connected components. Link parameters associated with the negotiated data transmission speed are calibrated and implemented in a Phy layer of the interface before data is transmitted across the interface. The calibrated link parameters include signal transmission settings for amplitude, pre-emphasis, equalization and timing. Default settings of the link parameters correspond to the slowest data transmission speed supported by the serially connected components. The serially connected components are calibrated each time system power is initialized. The serially connected components can be a host computer linked to a data storage device such as a backplane-based storage subsystem.

23 Claims, 4 Drawing Sheets

U.S. PATENT DOCUMENTS

| | | |
|---|---|---|
| 7,656,799 B2 * | 2/2010 | Samuels et al. ............... 370/231 |
| 7,701,855 B2 * | 4/2010 | Onodera et al. ............. 370/235 |
| 8,005,222 B2 * | 8/2011 | Ito et al. ........................ 380/270 |
| 8,014,305 B1 * | 9/2011 | Gilbert et al. ................. 370/252 |
| 8,019,887 B2 * | 9/2011 | Chalupsky et al. ........... 709/233 |
| 2001/0027496 A1 | 10/2001 | Boucher |
| 2001/0029520 A1 * | 10/2001 | Miyazaki et al. ............. 709/200 |
| 2003/0055988 A1 | 3/2003 | Noma |
| 2003/0131122 A1 * | 7/2003 | Kondo et al. ................. 709/233 |
| 2004/0243666 A1 * | 12/2004 | Wood ........................... 709/202 |
| 2005/0002340 A1 * | 1/2005 | Onodera et al. .............. 370/253 |

* cited by examiner

METHOD AND APPARATUS FOR AUTOMATIC PHY CALIBRATION BASED ON NEGOTIATED LINK SPEED

FIELD OF THE INVENTION

This application relates generally to high-speed interfaces, and more particularly to a high-speed interface that negotiates a data transmission speed between serially connected components and calibrates link parameters of the serially connected components associated with the negotiated data transmission speed.

BACKGROUND OF THE INVENTION

The performance of a computing system can be improved by increasing the bandwidth across a high-speed interface that transfers data between two components of the computing system. The attenuation of a transmitted signal over the high-speed interface presents a significant challenge to realizing or achieving increased bandwidth. As the frequency of the signal or effective baud rate increases, so does attenuation. Thus, data reliability is compromised unless the signal is conditioned during transmission.

Data transmission rates in a high-speed serial interface may exceed 1 Gigabaud. The components linked to the interface negotiate to a common baud rate to ensure data reliability at the negotiated link speed. Existing host bus adapters implement the negotiation to improve performance of a particular system. The negotiation complicates interface design since a scheme to improve one particular computing system may not improve a different computing system. The implementation of a unique negotiation scheme for different computing systems is expensive. Accordingly there is a need for a high-speed serial interface that overcomes signal integrity problems associated with increased data transmission speeds by interactively negotiating the appropriate data transmission speed of components linked to the serial interface. Against this backdrop the present invention has been developed.

SUMMARY OF THE INVENTION

The present invention provides a solution to this and other problems, and offers other advantages over the prior art. An embodiment of the present invention is a method for calibrating serially connected components of a computer system linked by an interface to a negotiated data transmission speed supported by the serially connected components. The method includes operations of transmitting a first alignment signal at the fastest data transmission speed supported by the interface; detecting if the first alignment signal is acknowledged by the serially connected components; transmitting a second alignment signal at the next fastest data transmission speed supported by the interface if the first alignment signal is not acknowledged by the serially connected components; selecting the data transmission speed associated with the alignment signal acknowledged by the serially connected components; and storing link parameter calibrations in the interface corresponding to the selected data transmission speed if the selected data transmission speed is not the slowest data transmission speed supported by the interface.

An apparatus in accordance with an embodiment of the present invention for calibrating serially connected components of a computer system to a negotiated data transmission speed supported by the serially connected components utilizes a Serial Advanced Technology Attachment (ATA) interface that links the serially connected components. The interface negotiates the fastest data transmission speed supported by the serially connected components and calibrates link parameters of the serially connected components associated with the negotiated data transmission speed. The calibrated link parameters are implemented in the interface before data is transmitted across the interface. The serially connected components include a host computer and a data storage device such as a backplane-based storage subsystem. The calibrated link parameters include signal transmission settings for amplitude, pre-emphasis, equalization and timing.

These and various other features as well as advantages which characterize the present invention will be apparent from a reading of the following detailed description and a review of the associated drawings.

DETAILED DESCRIPTION

Figure 1:
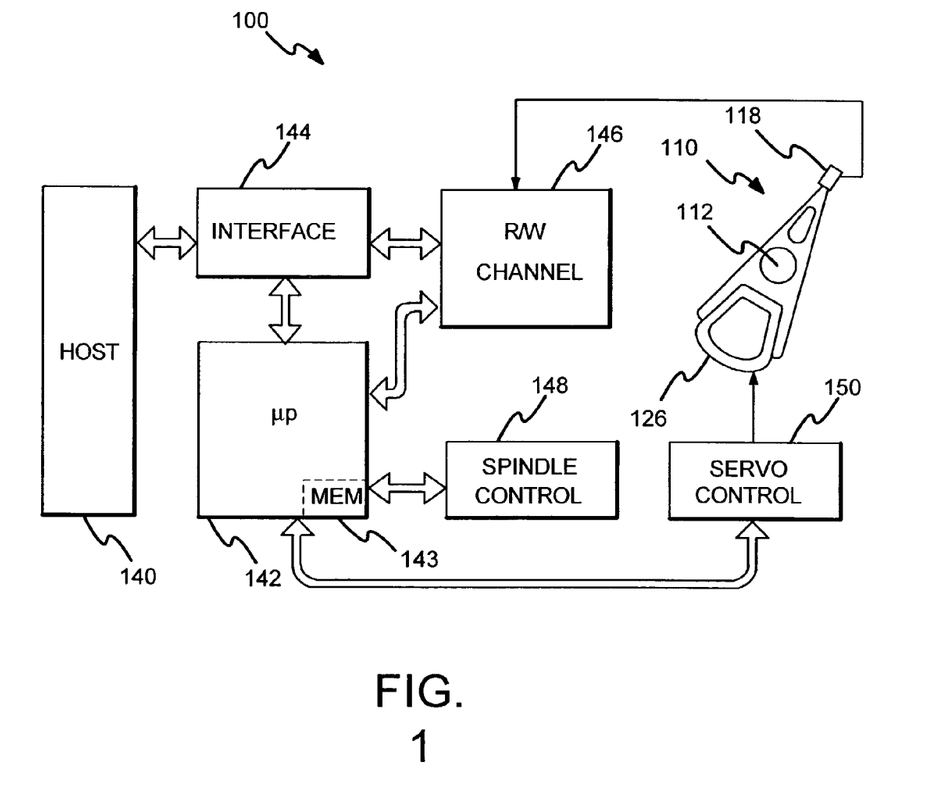
FIG. 1 is a functional block diagram of a data storage device connected to a host via an interface in accordance with an embodiment of the present invention.

A functional block diagram of a disc drive data storage device is shown in FIG. 1. The block diagram generally shows the main functional circuits which are resident on a disc drive printed circuit board and used to control the operation of a disc drive 100. The disc drive 100 is operably connected to a host computer 140 in a conventional manner. A microprocessor 142 generally provides top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

Discs (not shown) are rotated at a high speed by a spindle motor control circuit 148, which typically electrically commutates with a spindle motor through the use of back electromotive force sensing. During a seek operation, wherein an actuator assembly 110 moves heads 118 between tracks on the disc surfaces, the position of the heads 118 is controlled through the application of current to a coil 126 of a voice coil motor. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the transducer heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

The interface 144 can utilize high-speed serial link disc-interface technology referred to as Serial Advanced Technology Attachment (ATA). The interface 144 can be a high-speed serial ATA transceiver that links the host computer 140 to the read/write channel 146. Other high speed interfaces may be utilized such as a serially attached small computer system interface (SCSI) or a fibre channel. The current (first generation) data transmission rate for serial ATA is 150 MB/sec of data transfer. First generation data transmission requires a link speed of 1.5 GHz for serial transmission between the host computer 140 and the read/write channel 146. Signals transmitted at the first generation link speed typically have an amplitude of 500 mV±100 mV. A second generation data rate is 300 MB/sec with a link speed of 3.0 Gbps, while a third generation data rate is 600 MB/sec with a link speed 6.0 Gbps. Industry standards have also been set for parameters such as first generation signal amplitudes at various points on the high-speed link, out-of-band (OOB) signals used to establish the link and maintain optimal power consumption, and other parameters.

Figure 2:
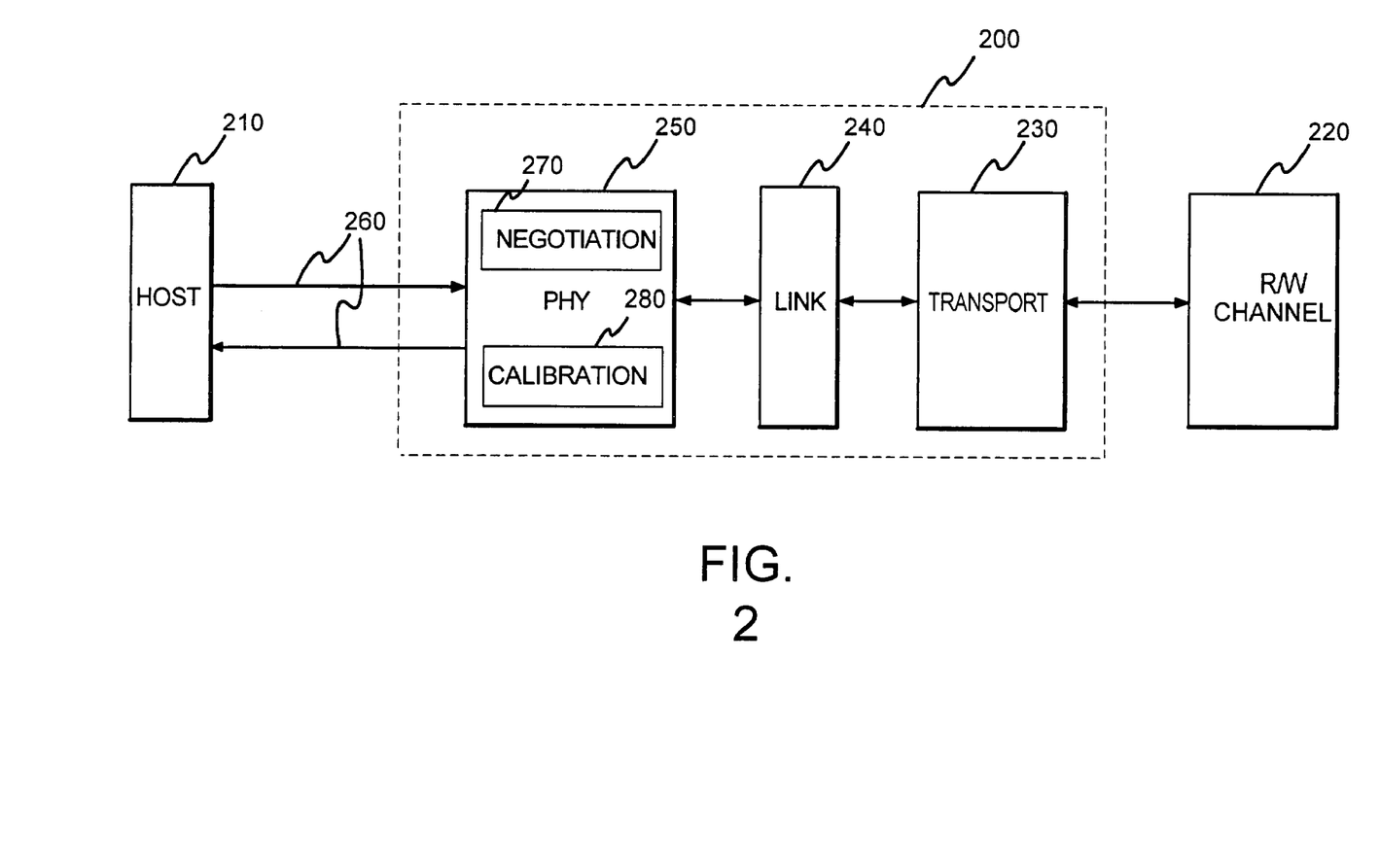
FIG. 2 is a functional block diagram illustrating a serial ATA interface linking a host computer to a read/write channel of a disc drive in accordance with an embodiment of the present invention.

A functional block diagram of a high-speed serial ATA interface 200 linking a host computer 210 to a read/write channel 220 of a disc drive is shown in FIG. 2. In accordance with the serial ATA protocol interface standard, the interface 200 includes three different layers: a transport layer 230, a link layer 240, and a Phy layer 250. The transport layer 230 is directly linked to the read/write channel 220. The Phy layer 250 transmits and receives serial ATA signals to and from the host computer 210 via a differential signal pair 260. The link layer 240 is coupled between the transport layer 230 and the Phy layer 250.

Data packets are composed and decomposed at the transport layer 230. The link layer 240 ensures interface alignment via handshaking and data streaming. The Phy layer 250 is associated with the physical configuration of the system, i.e., connectors, electrical specifications, copper cables, impedances, and the like. The Phy layer 250 receives encoded data from the link layer 240. Data is serialized and transmitted at the Phy layer 250. The Phy layer 250 is also responsible for deserializing the data received from the link layer 240 and interpreting OOB signaling.

The Phy layer 250 includes a negotiation module 270 and a calibration module 280. The negotiation module 270 negotiates the fastest data transmission speed supported by the host computer 210 and the disc drive. The calibration module 280 calibrates link parameters of the host computer 210 and the disc drive associated with the negotiated data transmission speed.

The serial ATA interface 200 can link the host computer 210 to a cable-based or a backplane-based storage subsystem. Signal degradation is negligible in a serial ATA co-axial cable due to the ideal co-axial electrical properties of the serial ATA cable. Backplane-based storage subsystems, on the other hand, exhibit greater signal losses and greater variance of loss compared to cable-based storage subsystems. The signal degradation is due to the dissipative electrical properties of the materials used in common backplanes and the varying lengths of signal traces in such implementations.

Figure 3:
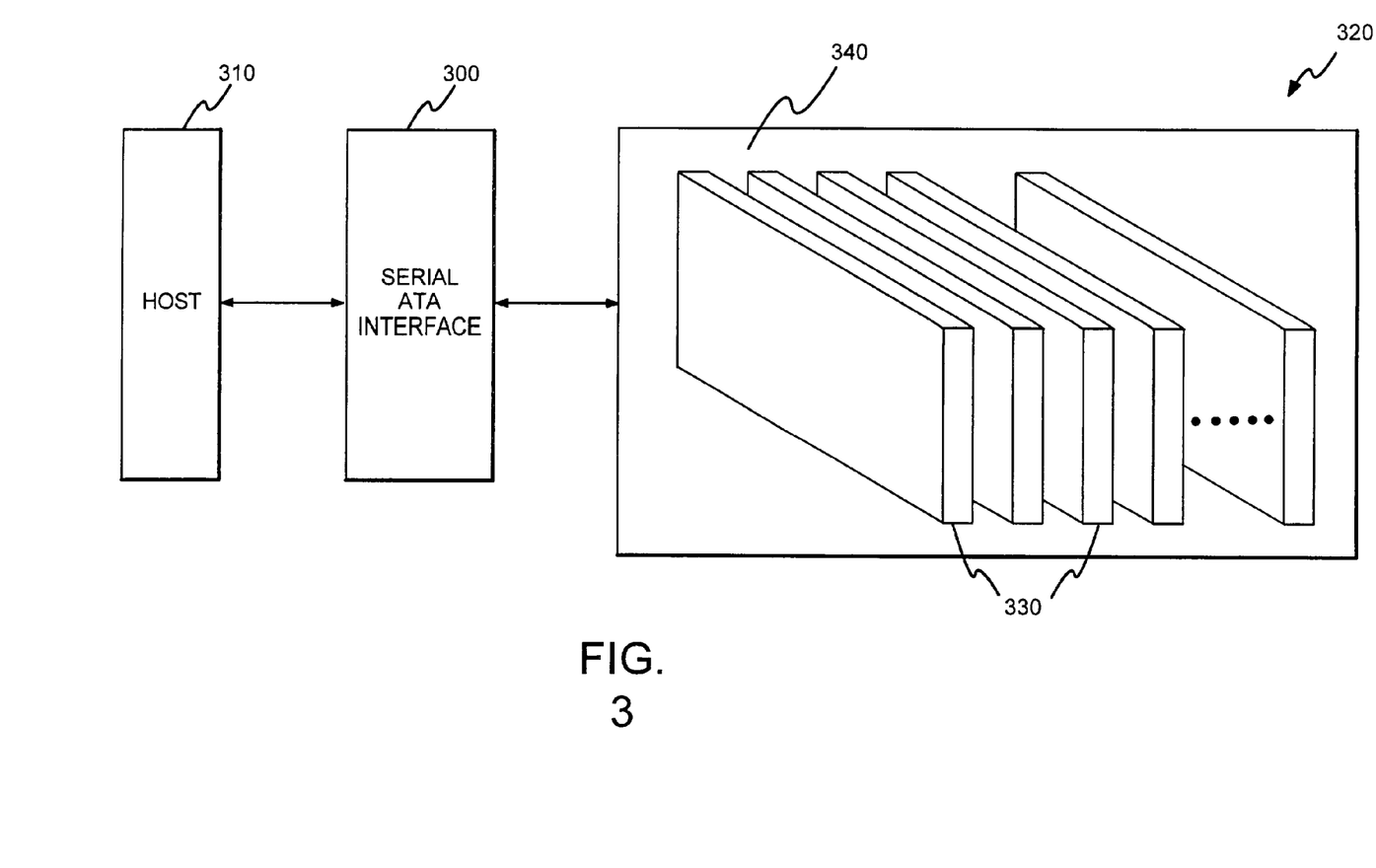
FIG. 3 is a functional block diagram illustrating a serial ATA interface linking a host computer to a backplane-based storage subsystem in accordance with an embodiment of the present invention.

A functional block diagram illustrating a serial ATA interface 300 linking a host computer 310 to a backplane-based storage subsystem 320 is shown in FIG. 3. The storage subsystem 320 includes several disc drives 330 attached to a rack mount 340. The disc drives 330 communicate with the host computer 310 through the serial ATA interface 300. At first generation link speeds, a 19" rack mount 340 overcomes the adverse affects of signal degradation resulting from the close proximity of the disc drives of the storage subsystem 320. However, typical voltage levels may not maintain signal integrity to guarantee data robustness and performance at higher data transmission speeds, i.e., second and third generation speeds, in a 19" rack mount configuration such as rack mount 340. Thus, signal speeds might be increased and other parameters, such as signal pre-emphasis may be modified as well. However, link parameters such as signal transmission amplitudes cannot be arbitrarily increased while maintaining interoperability with first generation components. For example, first generation transmission amplitudes are launched at a nominal 500 mV. First generation receivers are designed to recognize signals as valid within a range of approximately 325-600mV. Second generation components are designed to launch voltage signals as high as 1 volt. If a first generation component is attached to a second generation component that launches 1 volt signals, the first generation component may become damaged due to electrical overstress or may fail to recognize the received signal as a valid data or control packet. To overcome this problem, the serial ATA specifications are designed such that during the process of establishing a link between serially connected components (e.g., a host and a storage device) the components actively negotiate for the best possible link speed. However, the specifications do not provide any guidance on accommodating other link parameters such as voltage tuning for equalization, different settings for different link speeds or first-in-first-out (FIFO) buffer memory management.

Figure 4:
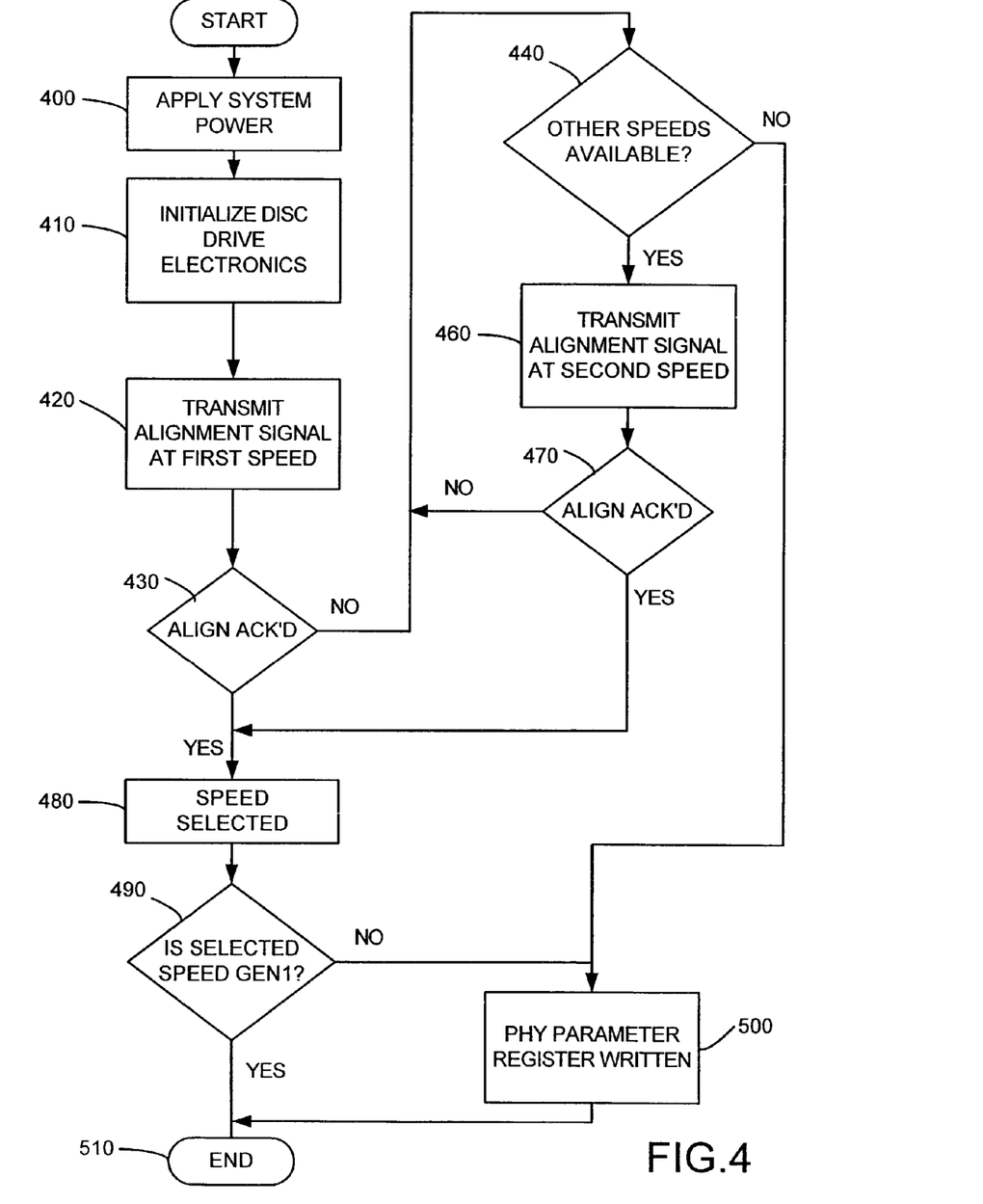
FIG. 4 is an operational flow diagram of a process for calibrating serially connected components linked by an interface to a negotiated link speed supported by the serially connected components in accordance with the present invention.

A method for calibrating serially connected components of a computing system linked by a serial ATA interface 200 to a negotiated data transmission speed supported by the serially connected components in accordance with an embodiment of the present invention is illustrated in FIG. 4. The process begins at Operation 400. In Operation 400, the serially connected components are initialized. Process control then transfers to Operation 410. In Operation 410, the default values of link parameters of the serially connected components are set to values corresponding to the first generation specification for serial ATA. Process control then transfers to Operation 420. In Operation 420, an alignment signal is transmitted between the serially connected components such as the host computer 140 and the disc drive 100 at a first data transmission speed. In accordance with one embodiment of the invention the first data transmission speed is the highest data transmission speed supported by the interface 200. Process control then transfers to Query Operation 430.

Query Operation 430 tests whether the alignment signal of the serially connected components is acknowledged by the components. Process control transfers to Query Operation 440 if the alignment signal is not acknowledged by the serially connected components. Process control transfers to Operation 480 if the alignment signal is acknowledged by the serially connected components.

If, in Query Operation 430, the alignment signal is not acknowledged by the serially connected components, in Query Operation 440, the availability of other data transmission speeds is determined. Process control transfers to Operation 500 if the interface 200 does not support any other data transmission speeds. Process control transfers to Operation 460 if the interface 200 supports other data transmission speeds. If other data transmission speeds are supported by the interface 200, in Operation 460, an alignment signal is transmitted at a second data transmission speed. In accordance with an embodiment of the present invention the second data transmission speed is the next fastest data transmission speed supported by the interface 200. Process control then transfers to Query Operation 470

Query Operation 470 tests whether the alignment signal of the serially connected components is acknowledged by the components. Process control transfers to Query Operation 440 if the alignment signal is not acknowledged by the serially connected components. Process control transfers to Operation 480 if the alignment signal is acknowledged by the serially connected components.

If, in Operation 470, the alignment signal is acknowledged by the serially connected components, in Operation 480, the data transmission speed corresponding to the acknowledged alignment signal is selected and process control transfers to Query Operation 490. In Query Operation 490, the data transmission speed is identified (e.g. first generation, second generation, third generation, etc.) Default values for the transmission signal settings are established for first generation link speeds. The link speed is negotiated from the default values to guarantee backward compatibility with first generation transceivers. Process control transfers to Operation 500 if the data transmission speed is not first generation. Process control transfers to Operation 510 if the data transmission speed is first generation. If the data transmission speed is not first generation, in process 500, link parameter calibrations of the serially connected components corresponding to the selected data transmission speed are written to registers in the Phy layer 250 of the serial ATA interface 200. If no other data transmission speeds are supported by the interface 200, in process 500, selected link parameters such as signal amplitude can be written to the registers in the Phy layer 250. At first generation data transmission speeds, impedance issues in certain implementations may warrant some automatic adjustment capabilities. These calibrations modify the default transmission signal settings related to amplitude, pre-emphasis, equalization and timing. In this way, the link parameters of the serially connected components are optimized at the Phy layer 250 of the serial ATA interface 200 to maximize the robustness of the high-speed communication link. Process control then transfers to Operation 510. In Operation 510, the process ends.

The negotiation and calibration just described occurs at Phy initialization before servo power control is provided to the disc drive, i.e., before any data packets are transmitted from the read/write channel 220 to the interface 200. Performing the negotiation/calibration before power initialization does not interfere with the staggered spin feature typical of multiple-disc data storage subsystems. Thus, custom disc-based data is not necessary to perform the Phy initialization. Current market demands dictate that a newly manufactured disc drive is calibrated for low-cost, high volume, first generation host systems. Calibrations for other host systems begin at the first generation baseline. The serial ATA interface 200 is not calibrated to support a particular data transmission speed prior to installation in any particular host configuration. Calibration occurs each time system power is initialized. The link parameters can be modified by any process that may be completed prior to transmission of data packets across the interface 200. Link parameter modification can be facilitated by program storage methods on any suitable components on the interface 200. In addition, speed negotiation and Phy layer register writes can be asymmetrical, i.e., components on the interface 200 may implement the solution independent of methods used to assure a robust link elsewhere on the interface 200.

The method of the present invention maintains interoperability across a range of serial ATA specification-compliant data transmission speeds and link parameters in typical storage subsystems. The method optionally enables custom signal conditioning based on a given storage solution. In such situations, one set of signal conditioning may be used for a dissipative environment (e.g. backplane-based storage subsystems), while a less aggressive conditioning program may be used in less dissipative environments (e.g. cable-based storage subsystems). In either case, modifications to the link parameters are made only after speed is negotiated.

In summary, an embodiment of the invention described herein may be viewed as a method for calibrating serially connected components (such as 100 and 140) that are linked by an interface (such as 200) in a computing system to a negotiated data transmission speed supported by the serially connected components (such as 100 and 140). The method includes operations of: transmitting a first alignment signal at a first data transmission speed supported by the interface (such as in step 420); detecting if the first alignment signal is acknowledged by the serially connected components (such as in step 430); transmitting a second alignment signal at a second data transmission speed supported by the interface if the first alignment signal is not acknowledged by the serially connected components (such as in step 460); selecting a data transmission speed associated with the alignment signal acknowledged by the serially connected components (such as in step 480); and storing link parameter calibrations corresponding to the selected data transmission speed in the interface if the selected data transmission speed is not a third predetermined data transmission speed supported by the interface (such as in step 500).

The method can also include operations of: initializing the serially connected components (such as in step 400); determining the availability of other data transmission speeds if the first and second alignment signals are not acknowledged (such as in step 440); and setting default values of the link parameters to values corresponding to a slowest data transmission speed supported by the interface (such as in step 410). The operation of storing link parameter calibrations can also include writing calibration values to registers in a Phy layer of a Serial Advanced Technology Attachment (ATA) interface, a serially attached SCSI or a fibre channel, and writing one or more settings for a signal to be transmitted over the interface (such as in step 500).

Another embodiment of the invention described herein may be viewed as an apparatus for calibrating serially connected components (such as 310 and 320) of a computer system to a negotiated data transmission speed supported by the serially connected components (such as 310 and 320). The apparatus includes a negotiation module (such as 270), a calibration module (such as 280), and an interface (such as 200). The negotiation module (such as 270) negotiates the fastest data transmission speed supported by the serially connected components (such as 310 and 320). The calibration module (such as 280) calibrates link parameters of the serially connected components (such as 310 and 320) associated with the negotiated data transmission speed. The interface (such as 200) serially links the components (such as 310 and 320) and implements the calibrated link parameters in the interface (such as 200) before data is transmitted across the interface (such as 200).

The interface (such as 200) can be a serial ATA interface, a serially attached SCSI or a fibre channel. The negotiation module (such as 270) and the calibration module (such as 280) can be implemented in a Phy layer (such as 250) of the interface (such as 200). The interface (such as 200) can link a host computer (such as 140) to a read/write channel (such as 146) of a data storage device (such as 100). The data storage device (such as 100) can be a backplane-based storage subsystem (such as 320).

The calibrated link parameters can include signal transmission settings for amplitude, pre-emphasis, equalization and timing. The default settings of the link parameters can be stored in the interface (such as 200). The default settings can correspond to the slowest data transmission speed supported by the serially connected components (such as 310 and 320). The serially connected components (such as 310 and 320) can be calibrated each time system power is initialized.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the present invention can be implemented in telecommunication devices, such as modems, to automatically calibrate link parameters to establish a viable link with a counterpart component on the other end of a telephone connection. Numerous other changes may be made which will readily suggest themselves to those skilled in the art and which are encompassed in the spirit of the invention disclosed and as defined in the appended claims.

What is claimed is:

1. A method comprising:
   detecting if a first signal transmitted at a first data transmission speed supported by an interface is acknowledged by serially connected components;
   detecting if second signal transmitted at a second data transmission speed supported by the interface is acknowledged by the serially connected components;
   selecting a data transmission speed associated with the signal acknowledged by the serially connected components, wherein each of the detecting operations and the selecting operation is implemented at phy layer of the interface; and
   storing at least one of signal transmission settings of the serially connected components corresponding to the selected data transmission speed in the phy layer of the interface.

2. The method of claim 1, further comprising transmitting the first signal at a fastest data transmission speed supported by the interface.

3. The method of claim 2, further comprising transmitting the second signal at a next fastest data transmission speed supported by the interface.

4. The method of claim 1, wherein storing at least one of the signal transmission settings comprises storing at least one of the signal transmission settings corresponding to the selected data transmission speed in the interface if the selected data transmission speed is not a slowest data transmission speed supported by the interface.

5. The method of claim 1, further comprising initializing the serially connected components.

6. The method of claim 1, further comprising determining availability of other data transmission speeds if the first and second signals are not acknowledged.

7. The method of claim 1, storing at least one of the signal transmission settings further comprises writing one or more settings for a signal to be transmitted over the interface, the settings including amplitude, pre-emphasis, equalization and timing.

8. The method of claim 1, further comprising setting default values of the at least one of the signal transmission settings to values corresponding to a slowest data transmission speed supported by the interface.

9. The method of claim 1, wherein the second signal is transmitted if the first signal is not acknowledged by the serially connected components.

10. The method of claim 1 further comprising storing signal transmission setting of the serially connected components corresponding to a slowest data transmission speed supported by the serially connected components as the default signal transmission setting.

11. The method of claim 1, wherein the signal transmission setting of the serially connected components is different than the transmission speed of the interface.

12. An apparatus comprising:
   a negotiation module that is arranged to negotiate a fastest data transmission speed supported by serially connected components, wherein the negotiation module being implemented in a phy layer of an interface;
   a calibration module that is arranged to calibrate at least one link parameter of the serially connected components associated with the negotiated data transmission speed; and
   the interface arranged to serially link the components and further arranged to implement the at least one calibrated link parameter in the interface before data is transmitted across the interface,
   wherein the interface is further configured to store at least one signal transmission setting of the serially connected components corresponding to the negotiated data transmission speed in phy layer of the interface.

13. The apparatus of claim 12, wherein the interface is one of a serial ATA interface, a serially attached SCSI or a fibre channel.

14. The apparatus of claim 13, wherein the negotiation module is implemented in a Phy layer of the ATA interface.

15. The apparatus of claim 13, wherein the calibration module is implemented in a Phy layer of the interface.

16. The apparatus of claim 12, wherein the signal transmission setting is one of signal transmission settings for amplitude, pre-emphasis, equalization or timing.

17. The apparatus of claim 12, wherein default settings of the at least one link parameter are stored in the interface, the default settings corresponding to the slowest data transmission speed supported by the serially connected components.

18. The apparatus of claim 12, wherein the serially connected components are calibrated each time system power is initialized.

19. An apparatus adapted to a computer system comprising:
   serially connected components linked by an interface; and
   means for calibrating at least one link parameter of the serially connected components to a negotiated data transmission speed supported by the interface interposed to the serially connected components such that the at least one calibrated link parameter is implemented in phy layer of the interface before data is transmitted across the interface, and means for storing at least one signal transmission setting of the serially connected components corresponding to the negotiated data transmission speed in phy layer of the interface.

20. The apparatus of claim 19, wherein the interface is one of a serial ATA interface, a serially attached SCSI or a fibre channel.

21. The apparatus of claim 20, wherein the at least one calibrated link parameter is implemented in a Phy layer of the interface.

22. The apparatus of claim 19, wherein the serially connected components are calibrated to the fastest data transmission speed supported by the serially connected components.

23. The apparatus of claim 19, wherein the serially connected components include a host computer linked to a data storage device.

* * * * *